United States Patent Office 3,759,728
Patented Sept. 18, 1973

3,759,728
HIGH-CHROME FUSED CAST REFRACTORIES
William A. Miller, Jamestown, and Henry R. Weiler, Jr., Lakewood, N.Y., assignors to The Carborundum Company, Niagara Falls, N.Y.
No Drawing. Filed Oct. 1, 1971, Ser. No. 185,857
Int. Cl. C04b 35/42
U.S. Cl. 106—59       7 Claims

ABSTRACT OF THE DISCLOSURE

Fused cast refractories having an approximate composition within the range $Cr_2O_3$ 75%–85%, MgO 5%–10%, FeO 5%–8%, $SiO_2$ 1%–4%, and $Al_2O_3$ less than 6% and characterized by a structure consisting mainly of grains of spinel having lath- or needle-like inclusions of an $R_2O_3$ phase, the spinel phase being predominantly MgO and $Cr_2O_3$ and the $R_2O_3$ phase being predominantly $Cr_2O_3$, together with a quite small amount of glass occurring intergranularly are found to have excellent resistance to corrosion by alkaline-earth borosilicate glasses such as "E" glass.

BACKGROUND OF THE INVENTION

Fused cast refractories have been known and used for many years. Such refractories, being essentially monolithic in structure, have presented many advantages in particular uses over the still older type of refractory products which comprise granular heat-resistant material bonded in desired shapes with heat-resistant ceramic materials. In particular, because of their inherently denser structure, some fused cast refractories have been found to resist extremely well attack by corrosive melts such as glass and molten metal oxides. In addition to their structure, however, the chemical composition of fused cast refractories is an important factor in providing resistance to corrosion.

Many different compositions for fused cast refractories have previously been suggested and it has been found that for specific uses certain compositions are superior. Consequently, a number of such refractory products of different compositions have been made commercially available, including a number which comprise chromium oxide, alumina, and magnesia. It has been found, however, that an alkaline earth borosilicate glass composition known as "E" glass, which is used extensively in the production of glass fibers, and which has a typical composition as follows:

|  | Percent |
|---|---|
| $SiO_2$ | 54.5 |
| $Al_2O_3$ | 14.5 |
| CaO | 22.0 |
| $B_2O_3$ | 8.5 |
| $Na_2O$ | 0.5 | is particularly corrosive to almost all such refractories and a need for more corrosion-resistant fused cast refractories for the lining of glass tanks used in making such glasses as "E" glass has been expressed. The compositions hereinafter described have been found to meet the need very satisfactorily.

SUMMARY OF THE INVENTION

The novel fused cast refractory products of the present invention have a composition within the following approximate range:

|  | Percent |
|---|---|
| $Cr_2O_3$ | 75–85 |
| MgO | 5–10 |
| FeO | 5–8 |
| $SiO_2$ | 1–4 |
| $Al_2O_3$ | Less than 6 |

In addition, in the refractory products the mol ratio of $Cr_2O_3$ to $Al_2O_3$ is greater than 10 and the $R_2O_3$:RO mol ratio is in the range from 1.5 to 2.3. The compositions have a high specific gravity, typically over 4.1, and excellent resistance to molten glasses, particularly alkaline-earth borosilicate glasses such as "E" glass.

They are preferably produced from chrome ore, Turkish and Transvaal ores being particularly suitable, with added chromium oxide and magnesium oxide to produce compositions within the above-stated range. Preferably, also, there is further added a small amount of an arc-stabilizer. A number of these are known. The amounts of arc-stabilizer employed are very small, 1% or less being effective, and consequently the composition of the products is not materially affected. In fact, in most cases it is extremely difficult if not impossible to ascertain from the product what, if any, stabilizer was used in its production.

The procedures for furnacing, casting, and annealing of the products are not critical. In general, known practices and procedures in the art can be used.

DESCRIPTION OF THE INVENTION

In producing fused cast refractory products in accordance with the invention, the constituent oxides can be employed in relatively pure form in preparing the furnace charges. However, this is generally too expensive and where cost is an important factor it is preferred to provide a substantial amount of the chromium oxide as chrome ore. Particularly useful for this purpose are commercial chrome ores of the types identified as Transvaal ore and Turkish ore, which not only have high $Cr_2O_3$ contents and relatively low contents of $Al_2O_3$, but also contain MgO. The following are typical compositions for these ores, although, as is well known, the compositions are not constant:

|  | Percent | |
|---|---|---|
|  | Transvaal ore | Turkish ore |
| $Cr_2O_3$ | 41.2 | 51.2 |
| MgO | 9.9 | 17.2 |
| $Al_2O_3$ | 16.8 | 13.2 |
| FeO | 26.1 | 12.7 |
| $SiO_2$ | 3.1 | 2.6 |

Both of these ores are used with additional chromium oxide added to the mix. Philippine chrome ore, however, because of its high $Al_2O_3$ content, typically more than 30%, can only be used to a small extent. As stated above, the entire chromium content of the furnace mix may, if desired, be derived from relatively pure chromium oxide. Relatively pure magnesium oxide is readily available and is preferably used when no chrome ore is used or when it is necessary to employ more MgO than is present in the chrome ore. In all cases when using a substantial amount of chrome ore, no extra iron oxide or aluminum oxide is necessary to obtain a composition in which FeO and $Al_2O_3$ are within the above-mentioned range. The ingredients for the furnace charges, in granular form, are thoroughly blended and the charge is furnaced in a 3-phase arc furnace operated at 75–150 volts in a water-cooled crucible, the charge forming its own furnace lining and increments of the charge being added periodically as fusion progresses.

The refractory products resulting from the present invention are very dense, with an average specific gravity greater than 4.1. In general, the products are characterized by a structure consisting mainly or predominantly of grains of a predominantly magnesia-chrome oxide spinel having lath- or needle-like inclusions of an $R_2O_3$ phase, and a quite small amount of glass occurring intergranularly. The $R_2O_3$ phase is a solid solution of indefinite and varying composition that is predominantly $Cr_2O_3$ but which may contain, in various proportions $Al_2O_3$ and $Fe_2O_3$. It is to be noted that magnesium oxide as periclase is absent from compositions according to the invention.

In corrosion tests carried out with molten glass, it has been found that the fused cast refractory products of the present invention are very resistive not only to soda-lime glasses, but also to the more corrosive alkaline-earth borosilicate glasses such as the "E" glass discussed above. In standard tests with the latter, the present novel refractories compare favorably with more expensive refractories such as sintered chrome oxide. In some tests it was found that the corrosion of blocks made in accordance with the present invention was only about 40% or less of that of a standard fused cast refractory block commonly used with such glass.

In extensive experimentation, it has been found that the composition of the novel fused cast refractories of the present invention is somewhat critical. The $Cr_2O_3$ content should be in the range from about 75% to about 85%, about 80% being preferred. Since $Al_2O_3$ is found in chrome ores, it will always be present when chrome ore is used as a raw material. However, the $Al_2O_3$ content of the refractories should be less than about 6% and in all cases the mol ratio of $Cr_2O_3$ to $Al_2O_3$ should be greater than 10. The MgO content is preferably from about 5% to about 10% and the FeO content from about 5% to about 8%. However, there may be some replacement of MgO or FeO by the other so long as the $R_2O_3$:RO mol ratio in the composition remains in the range from about 1.5–2.3. Up to about 4% silica will normally be present from the raw materials employed in the furnace charge. A preferred composition will show by analysis about 80% $Cr_2O_3$, about 8% MgO, about 4% $Al_2O_3$, about 6% FeO, and about 2% $SiO_2$.

Typical furnace charges which may be employed for the production of fused cast refractories in accordance with the present invention are:

(A)

| | Percent |
|---|---|
| Transvaal chrome ore | 25.3 |
| Chromium oxide ($Cr_2O_3$) | 68.7 |
| Magnesium oxide (MgO) | 6.0 |

(B)

| | Percent |
|---|---|
| Commercial chromium oxide ($Cr_2O_3$) | 80.2 |
| Aluminum oxide ($Al_2O_3$) | 9.9 |
| Magnesium oxide (MgO) | 9.9 |

(C)

| | |
|---|---|
| Transvaal chrome ore | 24.1 |
| Chromium oxide ($Cr_2O_3$) | 67.9 |
| Magnesium oxide (MgO) | 6.0 |

In the foregoing specification and the appended claims, percentages are by weight if not otherwise indicated.

We claim:

1. A fused cast refractory having, by analysis, approximately: 75%–85% $Cr_2O_3$, 5%–10% MgO, 5%–8% FeO, less than 6% $Al_2O_3$, and 1%–4% $SiO_2$, the mol ratio of $Cr_2O_3$ with a $Cr_2O_3$:$Al_2O_3$ mol ratio greater than 10, and $R_2O_3$:RO mol ratio being from 1.5 to 2.3, and being characterized by a high specific gravity and resistance to attack by molten glass, and particularly "E" glass.

2. A fused cast refractory as defined in claim 1 which is characterized by a structure consisting mainly of grains of a predominantly MgO and $Cr_2O_3$ spinel having lath- or needle-like inclusions of an $R_2O_3$ phase, predominantly $Cr_2O_3$, and a small amount of inter-granular glass.

3. A fused cast refractory as defined in claim 2 which is further characterized by the absence of MgO as periclase.

4. A fused cast refractory as defined in claim 1 analysis of which shows about 80% $Cr_2O_3$, about 8% MgO, about 4% $Al_2O_3$, about 6% FeO, and about 2% $SiO_2$.

5. A fused cast refractory as defined in claim 4 which is characterized by a structure consisting mainly of grains of a predominantly MgO and $Cr_2O_3$ spinel having lath- or needle-like inclusions of an $R_2O_3$ phase, predominantly $Cr_2O_3$, and a small amount of inter-granular glass.

6. A fused cast refractory as defined in claim 5 which is further characterized by the absence of MgO as periclase.

7. A raw batch suitable for use in making fused cast refractory articles resistant to attack by molten glass consisting essentially of a mixture of chrome ore, chromic oxide and magnesium oxide, the chrome ore and chromic oxide being present in such proportions as to provide a composition having from about 75% to about 85% $Cr_2O_3$:$Al_2O_3$ mol ratio greater than 10, and the magnesium with a $Cr_2O_3$ oxide being present in such amounts as to maintain the MgO content between about 5% and 10% and the $R_2O_3$:RO mol ratio between about 1.5 and 2.3.

References Cited
UNITED STATES PATENTS

| | | | |
|---|---|---|---|
| 2,271,362 | 1/1942 | Field | 106—59 |
| 2,271,364 | 1/1942 | Field | 106—59 |
| 2,279,260 | 4/1942 | Benner et al. | 106—66 |
| 2,408,305 | 9/1946 | Field | 106—59 |
| 2,498,622 | 2/1950 | Mochel | 106—59 |

JAMES E. POER, Primary Examiner

U.S. Cl. X.R.

106—66

UNITED STATES PATENT AND TRADEMARK OFFICE
CERTIFICATE OF CORRECTION

PATENT NO. : 3,759,728
DATED : September 18, 1973
INVENTOR(S) : William A. Miller, Henry R. Weiler, Jr.

It is certified that error appears in the above-identified patent and that said Letters Patent are hereby corrected as shown below:

In the Claims:

Column 4, line 17, should read -- $Cr_2O_3$ to $Al_2O_3$ therein being greater than 10 and the --

Column 4, line 46, should read -- $Cr_2O_3$ with a $Cr_2O_3:Al_2O_3$ mol ratio greater than 10, and the magnesium --

Column 4, line 47 -- oxide being present in such amount as to --

Signed and Sealed this

Eighth Day of February 1983

[SEAL]

Attest:

Attesting Officer

GERALD J. MOSSINGHOFF

Commissioner of Patents and Trademarks